US010776374B2

(12) United States Patent
Valine et al.

(10) Patent No.: US 10,776,374 B2
(45) Date of Patent: Sep. 15, 2020

(54) SELF-MONITORING TIME SERIES DATABASE SYSTEM BASED ON MONITORED RATE OF CHANGE

(71) Applicant: salesforce.com, inc., San Francisco, CA (US)

(72) Inventors: Thomas Nicholas Valine, San Jose, CA (US); Bhinav Sura, San Mateo, CA (US); Rajavardhan Sarkapally, San Francisco, CA (US); Dilip Devaraj, Colma, CA (US)

(73) Assignee: salesforce.com, inc., San Francisco, CA (US)

( * ) Notice: Subject to any disclaimer, the term of this patent is extended or adjusted under 35 U.S.C. 154(b) by 184 days.

(21) Appl. No.: 14/980,455

(22) Filed: Dec. 28, 2015

(65) Prior Publication Data
US 2017/0185639 A1 Jun. 29, 2017

(51) Int. Cl.
*G06F 16/2458* (2019.01)
(52) U.S. Cl.
CPC .............................. *G06F 16/2477* (2019.01)
(58) Field of Classification Search
CPC .......................... G06F 17/3089; G06F 16/958
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,065,014 A * | 5/2000 | Wakio | G06F 17/30539 |
| 6,092,083 A | 7/2000 | Brodersen et al. | |
| 6,161,149 A | 12/2000 | Achacoso et al. | |
| 6,169,534 B1 | 1/2001 | Raffel et al. | |

(Continued)

OTHER PUBLICATIONS

U.S. Appl. No. 13/986,251, filed Apr. 16, 2013.

*Primary Examiner* — Mohammad S Rostami
(74) *Attorney, Agent, or Firm* — Dergosits & Noah LLP; Todd A. Noah

(57) ABSTRACT

A time series database system receives a trigger condition associated with time series data points corresponding to subsystems of the system. The system aggregates the time series data points associated with a first time into a first internal time series data point. The system aggregates the time series data points associated with a second time into a second internal time series data point if the first internal time series data point does not meet the trigger condition. The system calculates a projected internal time series data point based on the first internal time series data point and the second internal time series data point if the second internal time series data point does not meet the trigger condition. The system outputs a projected alert notification associated with the projected internal time series data point and the trigger condition if the projected internal time series data point meets the trigger condition.

20 Claims, 4 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,317,539 B2 * | 4/2016 | Sato ................ G06F 17/30289 |
| 9,753,935 B1 * | 9/2017 | Tobin ................ G06F 17/30554 |
| 10,476,903 B2 * | 11/2019 | Wilson ................ H04L 63/1408 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0119226 A1 * | 5/2011 | Ruhl ................ G06F 17/3089 706/52 |
| 2011/0231248 A1 * | 9/2011 | Vee ................ G06Q 30/00 705/14.45 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0032506 A1 * | 1/2014 | Hoey ................ G06F 17/30303 707/691 |
| 2014/0039683 A1 * | 2/2014 | Zimmermann ........ G06F 1/206 700/275 |
| 2014/0337474 A1 * | 11/2014 | Khuti ................ H04L 41/5038 709/217 |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2016/0062950 A1 * | 3/2016 | Brodersen ................ G06F 17/18 702/181 |
| 2016/0092484 A1 * | 3/2016 | Finkler ............ G06F 17/30336 707/715 |
| 2016/0203036 A1 * | 7/2016 | Mezic ................ G06F 11/079 714/819 |
| 2016/0370946 A1 * | 12/2016 | Hama ................ G06F 3/0418 |
| 2016/0378753 A1 * | 12/2016 | Taylor ................ H04L 67/1004 707/747 |
| 2017/0148264 A1 * | 5/2017 | Pichette ................ G06Q 30/06 |

* cited by examiner

SELF-MONITORING TIME SERIES DATABASE SYSTEM BASED ON MONITORED RATE OF CHANGE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Time series data is a sequence of data points, typically consisting of successive measurements made over a time interval. Examples of time series data are ocean tides, counts of sunspots, and the daily closing value of the Dow Jones Industrial Average. Time series data is frequently plotted via line charts. Many domains of applied science and engineering that involve temporal measurements use time series data. Time series data analysis includes methods for analyzing time series data in order to extract meaningful statistics and other characteristics of the data. Time series data forecasting is the use of a model to predict future values based on previously observed values. A time series database is a computer system that is optimized for handling time series data. In some fields, time series data is called a profile, a curve, or a trace. Despite the disparate names, many of the same mathematical operations, queries, or database transactions are useful for analyzing each of these time series data types. The implementation of a computerized database system that can correctly, reliably, and efficiently implement these operations must be specialized for time series data.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1A:
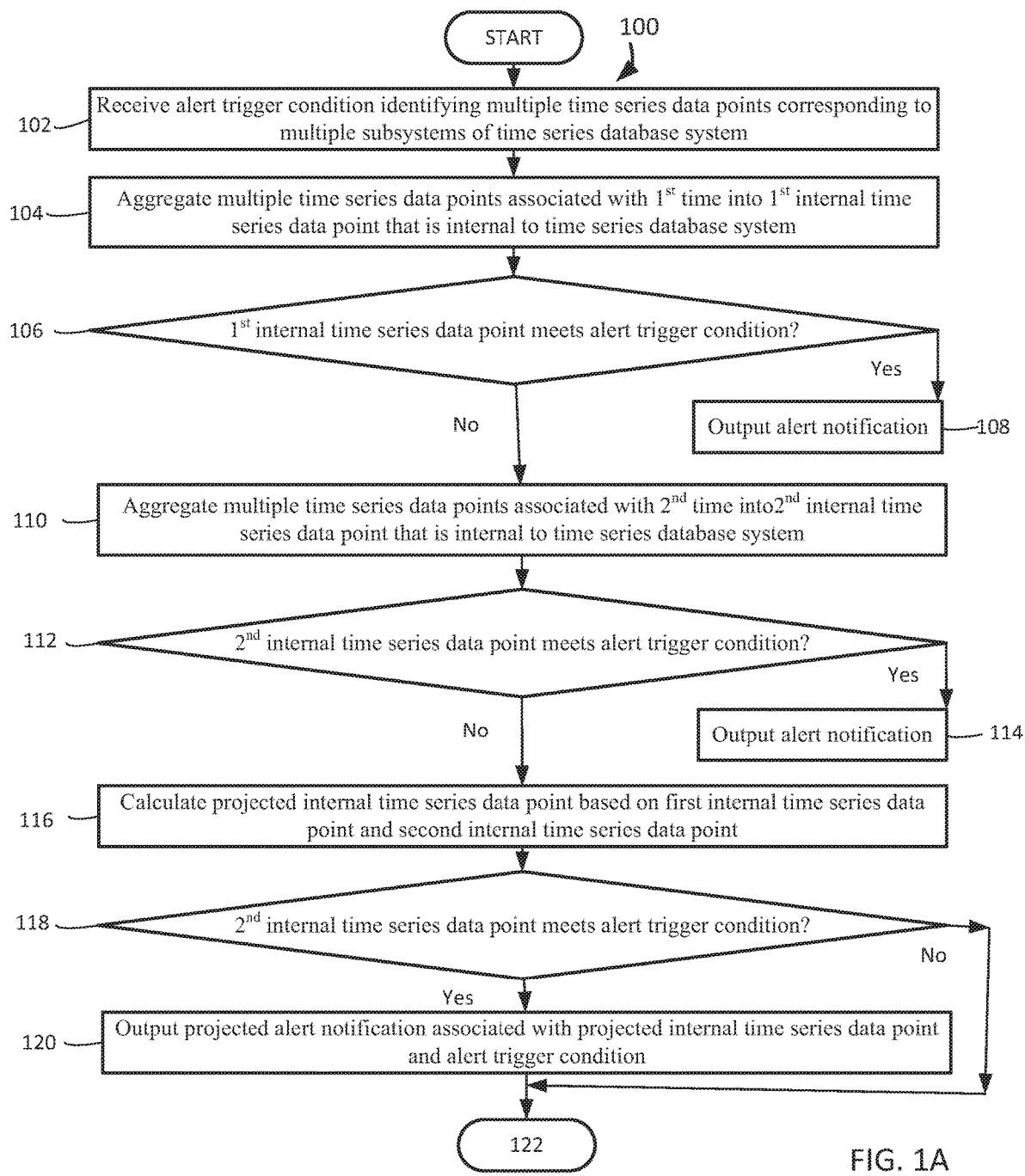
FIG. 1A and FIG. 1B depict an operational flow diagram illustrating a high level overview of a method for a self-monitoring time series database system based on monitored rate of change, in an embodiment.

Systems and methods are provided for a self-monitoring time series database system based on monitored rate of change. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and mechanisms for a self-monitoring time series database system based on monitored rate of change will be described with reference to example embodiments. The following detailed description will first describe a method for a self-monitoring time series database system based on monitored rate of change.

In accordance with embodiments described herein, there are provided methods and systems for a self-monitoring time series database system based on monitored rate of change. One skilled in the art will understand that a time series database system is a computer system that is optimized for handling time series data, but may be able to handle other data as well. A time series database system receives an alert trigger condition associated with multiple time series data points corresponding to multiple subsystems of the time series database system. The time series database system aggregates the multiple time series data points associated with a first time into a first internal time series data point that is internal to the time series database system. The time series database system aggregates the multiple time series data points associated with a second time into a second internal time series data point that is internal to the time series database system if the first internal time series data point does not meet the alert trigger condition. The time series database system calculates a projected internal time series data point based on the first internal time series data point and the second internal time series data point if the second internal time series data point does not meet the alert trigger condition. The time series database system outputs a projected alert notification associated with the projected internal time series data point and the alert trigger condition if the projected internal time series data point meets the alert trigger condition.

For example, a system administrator for a time series database system submits an alert trigger condition of 1,500 web service API calls per minute for the time series database system, and the time series database system identifies 5 time series data points that indicate web service API calls for 5 subsystems of the time series database system. The time series database system aggregates the 5 time series data points, which indicate a total of 1,200 web service API calls for the 5 subsystems at 11:02 A.M., into a first internal time series data point in the time series database system. The first internal time series data point indicating 1,200 web service API calls at 11:02 A.M. does not meet the alert trigger condition of 1,500 web service API calls per minute. Therefore, the time series database system aggregates the 5 time series data points, which indicate a total of 1,300 web service API calls for the 5 subsystems at 11:03 A.M., into a second internal time series data point.

Furthermore, the second internal time series data point indicating 1,300 web service API calls at 11:03 A.M. does not meet the alert trigger condition of 1,500 web service API calls per minute. Therefore, the time series database system calculates a projected internal time series data point of 1,500 web service API calls per minute at 11:05 A.M. based on 1,200 web service API calls per minute at 11:02 A.M. and 1,300 web service API calls per minute at 11:03 A.M. The time series database system outputs an alert email to inform a system administrator that the web service API calls for the 5 subsystems is projected to meet the alert trigger condition of 1,500 web service API calls per minute at 11:05 A.M. In contrast to other monitoring systems that monitor the health and state of time series database systems based on data that reflects a single point in time, the self-monitoring time series database system of the present disclosure monitors the health and state of time series database systems based on projecting time series data that reflects multiple points in time.

While one or more implementations and techniques are described with reference to an embodiment in which a self-monitoring time series database system based on monitoring rate of change is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Figure 1B:
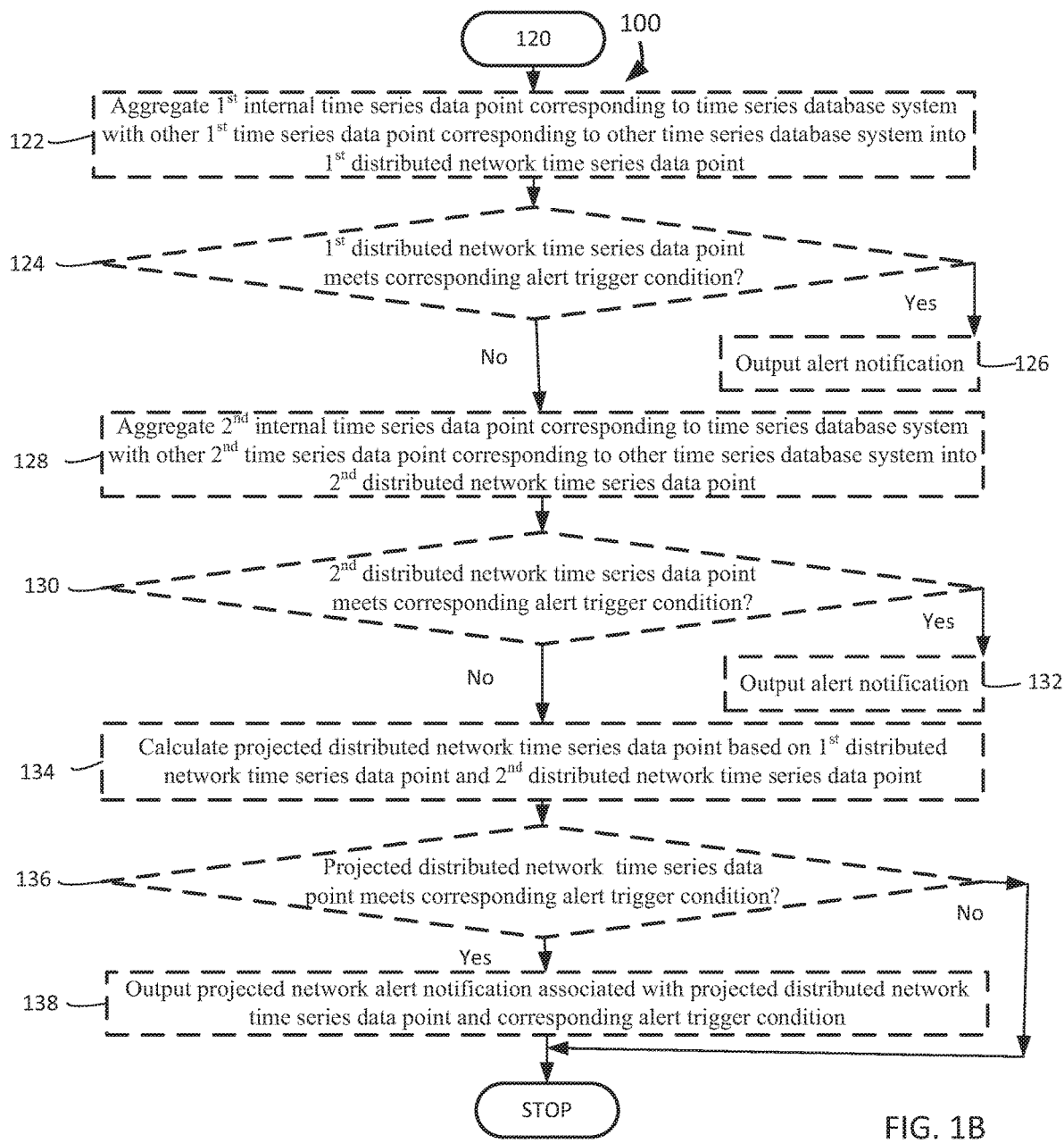

FIG. 1A and FIG. 1B depict an operational flow diagram illustrating a high level overview of a method 100 for a self-monitoring time series database system based on monitoring rate of change. A time series database system receives an alert trigger condition associated with multiple time series data points corresponding to multiple subsystems of the time series database system, block 102. For example and without limitation, this can include a system administrator for a time series database system submitting an alert trigger condition of 1,500 web service API calls per minute for the time series database system. This may also include the time series database system identifying 5 time series data points that indicate web service API calls for 5 subsystems of the time series database system.

Although this example describes the time series database system identifying the multiple time series data points that are associated with the alert trigger condition, a system administrator may identify the multiple time series data points that are associated with the alert trigger condition when submitting the alert trigger condition. While this example describes the time series database system receiving and processing a single alert trigger condition associated with multiple time series data points corresponding to multiple subsystems of the time series database system, the time series database system may receive and process any number of alert trigger conditions. Even though this example describes the time series database system receiving an alert trigger condition from a system administrator, the time series database may also receive an alert trigger condition from a configuration file.

For example, upon startup, the time series database system initially receives an alert trigger condition of 2,000 web service API calls per minute from a configuration file that was pre-configured prior to startup of the time series database system. Continuing this example, after months of operation, the time series database system receives an alert trigger condition of 1,500 web service API calls per minute from a system administrator who decided that the alert trigger condition of 2,000 web service API calls per minute was set too high for responding to the corresponding alert notification in a timely manner.

After receiving the alert trigger condition associated with multiple time series data points, the time series database system aggregates the multiple time series data points associated with a first time into a first internal time series data point that is internal to the time series database system, block 104. By way of example and without limitation, this can include the time series database system: 1) creating a global counter, 2) aggregating the 5 time series data points that indicate 1,200 web service API calls for the 5 subsystems at 11:02 A.M., into the global counter, 3) disabling subsystem aggregation to the global counter, 4) copying the aggregated value of 1,200 in the global counter to a temporary data structure, 5) resetting the global counter to zero, enabling subsystem aggregation to the global counter, and 6) persisting the aggregated value of 1,200 in the temporary data structure into a first internal time series data point in the time series database system.

Although this example describes the time series database system aggregating a single internal time series data point from multiple corresponding time series data points, the time series database system may aggregate any number of internal time series data points from their multiple corresponding time series data points. While this example describes the time series database system copying the aggregated value in the global counter to a temporary data structure, and then persisting the aggregated value in the temporary data structure to an internal time series data point, the time series database system may also copy the aggregated value in the global counter to an internal time series data point.

After aggregating the multiple time series data points associated with the first time into the first internal time series data point, the time series database system evaluates whether the first internal time series data point meets the alert trigger condition, block 106. In embodiments, this can include the time series database system evaluating whether the first internal time series data point aggregating the 5 time series data points that indicate a total of 1,200 web service API calls for the 5 subsystems at 11:02 A.M. meets the alert trigger condition of 1,500 web service API calls per minute for the time series database system. Although this example describes an alert trigger condition based on an internal time series data point meeting an alert threshold only once, the alert trigger condition may be met when an internal time series data point meets an alert threshold for any time period, such as 5 consecutive minutes, or when an internal time series data point meets an alert threshold any number of times in any time period, such as by meeting an alert threshold at least 7 times in any time period of 13 consecutive minutes. Even though this example describes the time series database system evaluating an internal time series data point on a minute-to-minute basis, the periodic evaluation period may be of any time duration, such as seconds or hours. While this example describes the time series database system evaluating whether a single internal time series data point meets a single alert trigger condition, the time series database system may evaluate any number of internal time series data points, and the time series database system may evaluate whether each one of these internal time series data points meets any number of alert trigger conditions.

The time series database system may evaluate that an internal time series data point meets an alert trigger condition if no data is collected from at least one of the multiple time series data points. For example, the time series database system evaluates that the alert trigger condition of 1,500 web service API calls per minute for the time series database system is met because no data is collected from a time series data point that indicates web service API calls for one of the subsystems. This lack of data collected may also indicate that the subsystem is so overwhelmed with web service API calls that the subsystem cannot record the number of its own web service API calls.

If the first internal time series data point meets the alert trigger condition, the method 100 continues to block 108 to output an alert notification. If the first internal time series data point does not meet the alert trigger condition, the method 100 proceeds to block 110 to aggregate the multiple time series data points for the multiple subsystems into a second internal time series data point.

If the first internal time series data point meets the alert trigger condition, the time series database system outputs an alert notification associated with the first internal time series data point and the alert trigger condition, block 108. For example and without limitation, this can include the time series database system outputting an alert email to inform a system administrator that the first internal time series data point indicates that the web service API calls for the 5 subsystems exceeds 1,500 web service API calls per minute for the time series database system, but does not repeat a similar alert email to the system administrator until 5 minutes later even if the web service API calls for the 5 subsystems continue to exceed 1,500 web service API calls per minute for the time series database system.

Waiting any specific amount of time to send additional alert notifications is referred to as a cool down period, which enables a system administrator to take action on a previous alert notification without bombarding the system administrator with a seemingly endless supply of alert notifications while the corresponding time series data points continue to meet the corresponding alert trigger condition. Although this example describes the time series database system communicating an alert notification via an email, the time series database system may communicate an alert notification via any combination of communications including emails, text messages, display screen updates, audible alarms, social network posts, tweets, writes to database records, etc. The system may also communicate an alert notification to a computer system, even the time series database system itself, in the form of control feedback, such that the computer system receiving the alert notification can take an action to mitigate an imminent failure.

If the first internal time series data point does not meet the alert trigger condition, the time series database system aggregates the multiple time series data points associated with a second time into a second internal time series data point that is internal to the time series database system, block 110. By way of example and without limitation, this can include the time series database system aggregating the 5 time series data points for the 5 subsystems, which indicate a total of 1,300 web service API calls for the 5 subsystems at 11:03 A.M., into a second internal time series data point. The time series database system may aggregate the second internal time series data point similarly to how the time series database system aggregated the first internal time series data point, as described above.

After aggregating the multiple time series data points associated with the second time into the second internal time series data point, the time series database system evaluates whether the second internal time series data point meets the alert trigger condition, block 112. In embodiments, this can include the time series database system evaluating whether the second internal time series data point indicating 1,300 web service API calls for the 5 subsystems at 11:03 A.M. meets the alert trigger condition of 1,500 web service API calls per minute. If the second internal time series data point meets the alert trigger condition, the method 100 continues to block 114 to output an alert notification. If the second internal time series data point does not meet the alert trigger condition, the method 100 proceeds to block 116 to calculate a projected internal time series data point based on the first internal time series data point and the second internal time series data point.

If the second internal time series data point meets the alert trigger condition, the time series database system outputs an alert notification associated with the second internal time series data point and the alert trigger condition, block 114. For example and without limitation, this can include the time series database system outputting an alert email to inform a system administrator that the second internal time series data point indicates that the web service API calls for the 5 subsystems exceeds 1,500 web service API calls per minute for the time series database system.

If the second internal time series data point does not meet the alert trigger condition, the time series database system calculates a projected internal time series data point based on the first internal time series data point and the second internal time series data point block 116. By way of example and without limitation, this can include the time series database system calculating a projected internal time series data point of 1,500 web service API calls per minute at 11:05 A.M. based on 1,200 web service API calls per minute at 11:02 A.M. and 1,300 web service API calls per minute at 11:03 A.M.

Calculating the projected internal time series data point may be based on the first internal time series data point and/or the second internal time series data point meeting a data threshold. For example, since the first internal time series data point's value of 1,200 web service API calls per minute and the second internal time series data point's value of 1,300 web service API calls per minute are both above the 50% threshold of the alert trigger condition of 1,500 web service API calls per minute, the time series database system calculates the projected internal time series data point. In another example, if the first internal time series data point's value of 600 web service API calls per minute and the second internal time series data point's value of 650 web service API calls per minute are both below the 50% threshold of the alert trigger condition of 1,500 web service API calls per minute, the time series database system does not calculate the projected internal time series data point, thereby avoiding unnecessary calculations.

Although this example describes the time series database system calculating the projected internal time series data point based on only two internal time series data points, the time series database system may calculate the projected internal time series data point based on any number of internal time series data points. While this example describes the time series database system calculating the projected internal time series data point based on a liner projection, the time series database system may calculate the projected internal time series data point based on any type of projection, such as exponential, logarithmic, or regression analysis, or combination thereof. Even though this example describes the time series database system calculating the projected internal time series data point based on meeting the alert trigger condition, the time series database system may calculate the projected internal time series data point based on a specified amount of time into the future, and then evaluate whether the projected internal time series data point meets the alert trigger condition within a specified time threshold.

After calculating the projected internal time series data point, the time series database system evaluates whether the projected internal time series data point meets the alert trigger condition, block 118. In embodiments, this can include the time series database system evaluating whether the projected internal time series data point of 1,500 web service API calls per minute at 11:05 A.M. meets the alert trigger condition of 1,500 web service API calls per minute. Evaluating whether the projected internal time series data point meets the alert trigger condition may be based on meeting a time threshold. For example, if the projected internal time series data point is projected to meet the alert trigger condition in 5 minutes, the time series database system processes the projected internal time series data point as having met the alert trigger condition. In another example, if the projected internal time series data point is projected to meet the alert trigger condition in 5 months, the time series database system processes the projected internal time series data point as having not met the alert trigger condition.

If the projected internal time series data point meets the alert trigger condition, the method 100 continues to block 120 to output a projected alert notification. If the projected internal time series data point does not meet the alert trigger condition, the method 100 proceeds to block 122 to optionally aggregate time series data points for time series database systems into a distributed network time series data point.

If the projected internal time series data point meets the alert trigger condition, the time series database system outputs a projected alert notification associated with the projected internal time series data point and the alert trigger condition, block 120. For example and without limitation, this can include the time series database system outputting an alert email to inform a system administrator that the web service API calls for the 5 subsystems is projected to be 1,500 web service API calls per minute at 11:05 A.M. Although this example describes the time series database system communicating a projected alert notification via an email, the time series database system may communicate a projected alert notification via any combination of communications including emails, text messages, display screen updates, audible alarms, social network posts, tweets, writes to database records, etc. The system may also communicate an alert notification to a computer system, even the time series database system itself, in the form of control feedback, such that the computer system receiving the alert notification can take an action to mitigate an imminent failure. In contrast to other monitoring systems that monitor the health and state of time series database systems based on data that reflects a single point in time, the self-monitoring time series database system of the present disclosure monitors the health and state of time series database systems based on projecting time series data that reflects multiple points in time.

When the time series database system has no more internal time series data points to evaluate against their corresponding alert trigger conditions, the time series database system optionally aggregates the first internal time series data point corresponding to the time series database system with another first time series data point corresponding to another time series database system into a first distributed network time series data point, block 122. By way of example and without limitation, this can include the time series database system aggregating the first internal time series data point indicating 1,200 web service API calls for the 5 subsystems at 11:02 A.M. with another first time series data point indicating 2,000 web service API calls for another time series database system's 4 subsystems at 11:02 A.M. into a first distributed network time series data point indicating 3,200 web service API calls at 11:02 A.M. for the distributed network.

After aggregating the first time series data points for the time series database systems into the first distributed network time series data point, the time series database system optionally evaluates whether the first distributed network time series data point meets a corresponding alert trigger condition, block 124. In embodiments, this can include the time series database system evaluating whether the first distributed network time series data point indicating 3,200 web service API calls for the distributed network at 11:02 A.M. meets a corresponding alert trigger condition of 3,500 web service API calls per minute. The alert trigger condition for the distributed network time series data point may be provided by a system administrator or a configuration file, or may be a combination of the alert trigger conditions for each of the time series database system's corresponding time series data points. Even though this example describes the time series database system evaluating a distributed network time series data point that is based on data communicated from an external time series database system, the two time series database systems can continue to self-monitor their own health and state even if the external communication between the two time series database systems is disrupted.

If the first distributed network time series data point meets the corresponding alert trigger condition, the method 100 continues to block 126 to output an alert notification. If the first distributed network time series data point does not meet the corresponding alert trigger condition, the method 100 proceeds to block 128 to aggregate the second time series data points for the time series database systems into a second distributed network time series data point.

If the first distributed network time series data point meets the corresponding alert trigger condition, the time series database system optionally outputs an alert notification associated with the first distributed network time series data point and the corresponding alert trigger condition, block 126. For example and without limitation, this can include the time series database system outputting an alert email to inform a system administrator for the time series database system that the first distributed network time series data point indicates that web service API calls for the distributed network exceeds 3,500 web service API calls per minute at 11:02 A.M.

If the first distributed network time series data point does not meet the corresponding alert trigger condition, the time series database system optionally aggregates the second internal time series data point for the time series database system with a second time series data point for the other time series database system into a second distributed network time series data point, block 128. By way of example and without limitation, this can include the time series database system aggregating the second internal time series data point indicating 1,300 web service API calls for the 5 subsystems at 11:03 A.M. with a second time series data point indicating 2,000 web service API calls for the other time series database system's 4 subsystems at 11:03 A.M. into a second distributed network time series data point indicating 3,300 web service API calls at 11:03 A.M. for the distributed network.

After aggregating the second time series data points for the time series database systems into the second distributed network time series data point, the time series database system optionally evaluates whether the second distributed network time series data point meets a corresponding alert trigger condition, block 130. In embodiments, this can include the time series database system evaluating whether the second distributed network time series data point indicating 3,300 web service API calls for the distributed network at 11:03 A.M. meets a corresponding alert trigger condition of 3,500 web service API calls per minute. If the second distributed network time series data point meets the corresponding alert trigger condition, the method 100 continues to block 132 to output an alert notification. If the second distributed network time series data point does not meet the corresponding alert trigger condition, the method 100 proceeds to block 134 to calculate a projected distributed network time series data point based on the first distributed network time series data point and the second distributed network time series data point.

If the second distributed network time series data point meets the corresponding alert trigger condition, the time series database system optionally outputs an alert notification associated with the second distributed network time series data point and the corresponding alert trigger condition, block 132. For example and without limitation, this can include the time series database system outputting an alert email to inform a system administrator for the time series database system that the second distributed network time series data point indicates that web service API calls for the distributed network exceeds 3,500 web service API calls per minute at 11:03 A.M.

If the second distributed network time series data point does not meet the corresponding alert trigger condition, the time series database system optionally calculates a projected distributed network time series data point based on the first distributed network time series data point and the second distributed network time series data point block 134. By way of example and without limitation, this can include the time series database system calculating a projected internal time series data point of 3,500 web service API calls per minute at 11:05 A.M. based on 3,200 web service API calls per minute at 11:02 A.M. and 3,300 web service API calls per minute at 11:03 A.M.

Calculating the projected distributed network time series data point may be based on the first distributed network time series data point and/or the second distributed network time series data point meeting a data threshold. For example, since the first distributed network time series data point's value of 3,200 web service API calls per minute and the second distributed network time series data point's value of 3,300 web service API calls per minute are both above the 50% threshold of the corresponding alert trigger condition of 3,500 web service API calls per minute, the time series database system calculates the projected distributed network time series data point. In another example, if the first distributed network time series data point's value of 1,600 web service API calls per minute and the second distributed network time series data point's value of 1,650 web service API calls per minute are both below the 50% threshold of the corresponding alert trigger condition of 3,500 web service API calls per minute, the time series database system does not calculate the projected distributed network time series data point, thereby avoiding unnecessary calculations.

Although this example describes the time series database system calculating the projected distributed network time series data point based on only two distributed network time series data points, the time series database system may calculate the projected distributed network time series data point based on any number of distributed network time series data points. While this example describes the time series database system calculating the projected distributed network time series data point based on a liner projection, the time series database system may calculate the projected distributed network time series data point based on any type of projection, such as exponential, logarithmic, or regression analysis, or combination thereof. Even though this example describes the time series database system calculating the projected distributed network time series data point based on meeting the corresponding alert trigger condition, the time series database system may calculate the projected distributed network time series data point based on a specified amount of time into the future, and then evaluate whether the projected distributed network time series data point meets the corresponding alert trigger condition within a specified time threshold.

After calculating the projected distributed network time series data point, the time series database system optionally evaluates whether the projected distributed network time series data point meets the corresponding alert trigger condition, block 136. In embodiments, this can include the time series database system evaluating whether the projected distributed network time series data point of 3,500 web service API calls per minute at 11:05 A.M. meets the corresponding alert trigger condition of 3,500 web service API calls per minute. Evaluating whether the projected distributed network time series data point meets the corresponding alert trigger condition may be based on meeting a time threshold. For example, if the projected distributed network time series data point is projected to meet the corresponding alert trigger condition in 5 minutes, the time series database system processes the projected distributed network time series data point as having met the alert trigger condition. In another example, if the projected distributed network time series data point is projected to meet the corresponding alert trigger condition in 5 months, the time series database system processes the projected distributed network time series data point as having not met the corresponding alert trigger condition.

If the projected distributed network time series data point meets the corresponding alert trigger condition, the method 100 continues to block 138 to output a projected alert notification. If the projected distributed network time series data point does not meet the corresponding alert trigger condition, the method 100 terminates.

If the projected distributed network time series data point meets the corresponding alert trigger condition, the time series database system optionally outputs a projected alert notification associated with the projected distributed network time series data point and the corresponding alert trigger condition, block 138. For example and without limitation, this can include the time series database system outputting an alert email to inform a system administrator that the web service API calls for the distributed network is projected to be 3,500 web service API calls per minute at 11:05 A.M.

The method 100 may be repeated as desired. Although this disclosure describes the blocks 102-138 executing in a particular order, the blocks 102-138 may be executed in a different order. In other implementations, each of the blocks 102-138 may also be executed in combination with other blocks and/or some blocks may be divided into a different set of blocks.

System Overview

Figure 2:
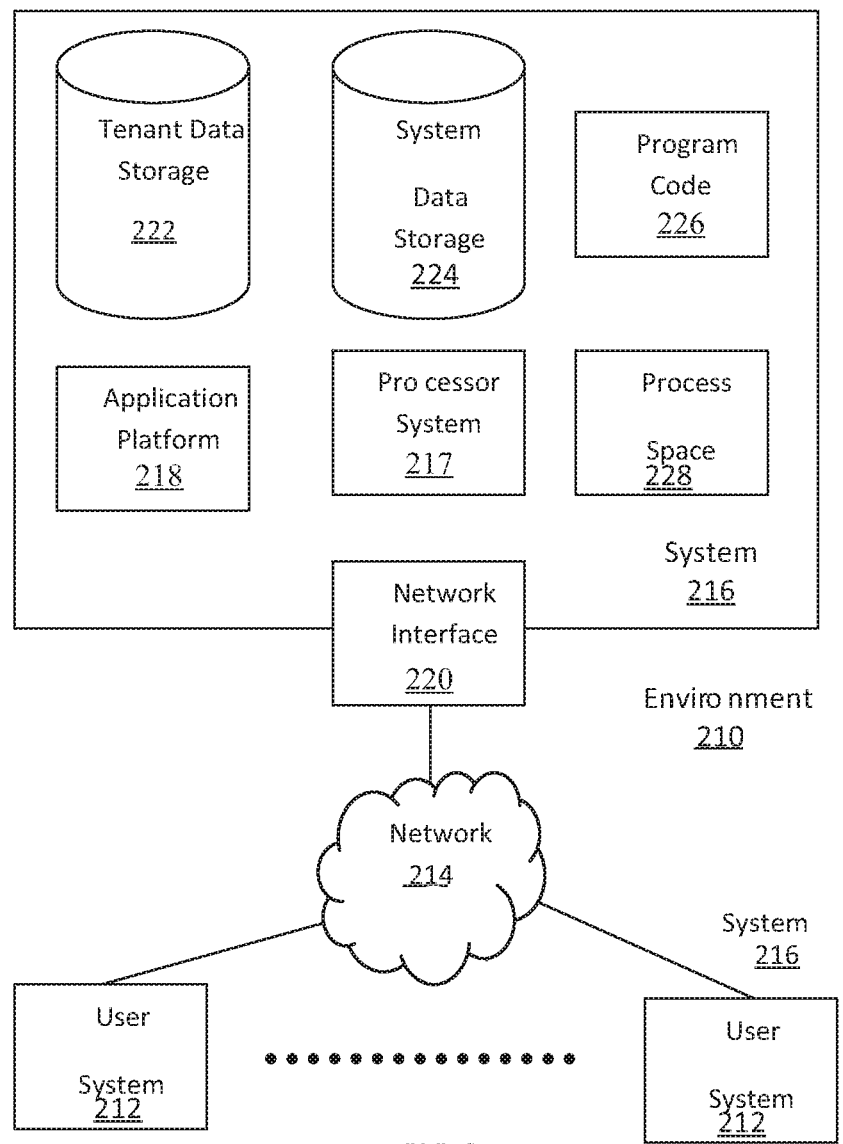
FIG. 2 illustrates a block diagram of an example of an environment wherein an on-demand database service might be used.

FIG. 2 illustrates a block diagram of an environment 210 wherein an on-demand database service might be used. The environment 210 may include user systems 212, a network 214, a system 216, a processor system 217, an application platform 218, a network interface 220, a tenant data storage 222, a system data storage 224, program code 226, and a process space 228. In other embodiments, the environment 210 may not have all of the components listed and/or may have other elements instead of, or in addition to, those listed above.

The environment 210 is an environment in which an on-demand database service exists. A user system 212 may be any machine or system that is used by a user to access a database user system. For example, any of the user systems 212 may be a handheld computing device, a mobile phone, a laptop computer, a work station, and/or a network of computing devices. As illustrated in FIG. 2 (and in more detail in FIG. 3) the user systems 212 might interact via the network 214 with an on-demand database service, which is the system 216.

An on-demand database service, such as the system 216, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 216" and the "system 216" will be used interchangeably herein. A database image may include one or more database objects. A relational database management system (RDMS) or the equivalent may execute storage and retrieval of information against the database object(s). The application platform 218 may be a framework that allows the applications of the system 216 to run, such as the hardware and/or software, e.g., the operating system. In an embodiment, the on-demand database service 216 may include the application platform 218 which enables creation, managing and executing one or more applications developed by the provider of the on-demand database service, users accessing the on-demand database service via user systems 212, or third party application developers accessing the on-demand database service via the user systems 212.

The users of the user systems 212 may differ in their respective capacities, and the capacity of a particular user system 212 might be entirely determined by permissions (permission levels) for the current user. For example, where a salesperson is using a particular user system 212 to interact with the system 216, that user system 212 has the capacities allotted to that salesperson. However, while an administrator is using that user system 212 to interact with the system 216, that user system 212 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 214 is any network or combination of networks of devices that communicate with one another. For example, the network 214 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 212 might communicate with the system 216 using TCP/IP and, at a higher network level, use other common Internet protocols to communicate, such as HTTP, FTP, AFS, WAP, etc. In an example where HTTP is used, the user systems 212 might include an HTTP client commonly referred to as a "browser" for sending and receiving HTTP messages to and from an HTTP server at the system 216. Such an HTTP server might be implemented as the sole network interface between the system 216 and the network 214, but other techniques might be used as well or instead. In some implementations, the interface between the system 216 and the network 214 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 216, shown in FIG. 2, implements a web-based customer relationship management (CRM) system. For example, in one embodiment, the system 216 includes application servers configured to implement and execute CRM software applications as well as provide related data, code, forms, webpages and other information to and from the user systems 212 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 216 implements applications other than, or in addition to, a CRM application. For example, the system 216 may provide tenant access to multiple hosted (standard and custom) applications, including a CRM application. User (or third party developer) applications, which may or may not include CRM, may be supported by the application platform 218, which manages creation, storage of the applications into one or more database objects and executing of the applications in a virtual machine in the process space of the system 216.

One arrangement for elements of the system 216 is shown in FIG. 2, including the network interface 220, the application platform 218, the tenant data storage 222 for tenant data 223, the system data storage 224 for system data 225 accessible to the system 216 and possibly multiple tenants, the program code 226 for implementing various functions of the system 216, and the process space 228 for executing MTS system processes and tenant-specific processes, such as running applications as part of an application hosting service. Additional processes that may execute on the system 216 include database indexing processes.

Several elements in the system shown in FIG. 2 include conventional, well-known elements that are explained only briefly here. For example, each of the user systems 212 could include a desktop personal computer, workstation, laptop, PDA, cell phone, or any wireless access protocol (WAP) enabled device or any other computing device capable of interfacing directly or indirectly to the Internet or other network connection. Each of the user systems 212 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 212 to access, process and view information, pages and applications available to it from the system 216 over the network 214. Each of the user systems 212 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 216 or other systems or servers. For example, the user interface device may be used to access data and applications hosted by the system 216, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 212 and all of its components are operator configurable using applications, such as a browser, including computer code run using a central processing unit such as an Intel Pentium® processor or the like. Similarly, the system 216 (and additional instances of an MTS, where more than one is present) and all of their components might be operator configurable using application(s) including computer code to run using a central processing unit such as the processor system 217, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 216 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 216 is configured to provide webpages, forms, applications, data and media content to the user (client) systems 212 to support the access by the user systems 212 as tenants of the system 216. As such, the system 216 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 3:
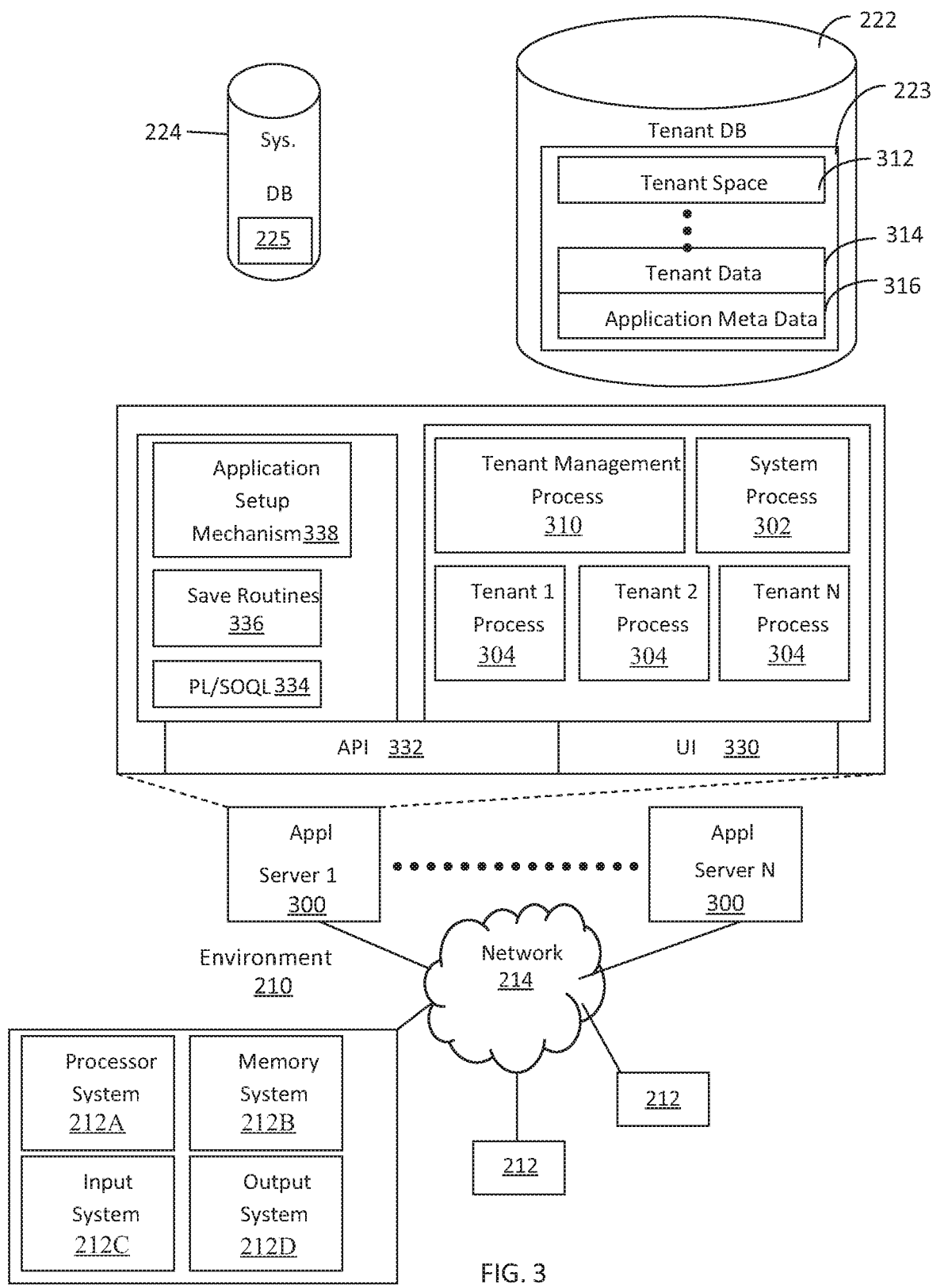
FIG. 3 illustrates a block diagram of an embodiment of elements of FIG. 2 and various possible interconnections between these elements.

FIG. 3 also illustrates the environment 210. However, in FIG. 3 elements of the system 216 and various interconnections in an embodiment are further illustrated. FIG. 3 shows that the each of the user systems 212 may include a processor system 212A, a memory system 212B, an input system 212C, and an output system 212D. FIG. 3 shows the network 214 and the system 216. FIG. 3 also shows that the system 216 may include the tenant data storage 222, the tenant data 223, the system data storage 224, the system data 225, a User Interface (UI) 330, an Application Program Interface (API) 332, a PL/SOQL 334, save routines 336, an application setup mechanism 338, applications servers $300_1$-$300_N$, a system process space 302, tenant process spaces 304, a tenant management process space 310, a tenant storage area 312, a user storage 314, and application metadata 316. In other embodiments, the environment 210 may not have the same elements as those listed above and/or may have other elements instead of, or in addition to, those listed above.

The user systems 212, the network 214, the system 216, the tenant data storage 222, and the system data storage 224 were discussed above in reference to FIG. 2. Regarding the user systems 212, the processor system 212A may be any combination of one or more processors. The memory system 212B may be any combination of one or more memory devices, short term, and/or long term memory. The input system 212C may be any combination of input devices, such as one or more keyboards, mice, trackballs, scanners, cameras, and/or interfaces to networks. The output system 212D may be any combination of output devices, such as one or more monitors, printers, and/or interfaces to networks. As shown by FIG. 3, the system 216 may include the network interface 220 (of FIG. 2) implemented as a set of HTTP application servers 300, the application platform 218, the tenant data storage 222, and the system data storage 224. Also shown is the system process space 302, including individual tenant process spaces 304 and the tenant management process space 310. Each application server 300 may be configured to access tenant data storage 222 and the tenant data 223 therein, and the system data storage 224 and the system data 225 therein to serve requests of the user systems 212. The tenant data 223 might be divided into individual tenant storage areas 312, which can be either a physical arrangement and/or a logical arrangement of data. Within each tenant storage area 312, the user storage 314 and the application metadata 316 might be similarly allocated for each user. For example, a copy of a user's most recently used (MRU) items might be stored to the user storage 314. Similarly, a copy of MRU items for an entire organization that is a tenant might be stored to the tenant storage area 312. The UI 330 provides a user interface and the API 332 provides an application programmer interface to the system 216 resident processes to users and/or developers at the user systems 212. The tenant data and the system data may be stored in various databases, such as one or more Oracle™ databases.

The application platform 218 includes the application setup mechanism 338 that supports application developers' creation and management of applications, which may be saved as metadata into the tenant data storage 222 by the save routines 336 for execution by subscribers as one or more tenant process spaces 304 managed by the tenant management process 310 for example. Invocations to such applications may be coded using the PL/SOQL 334 that provides a programming language style interface extension to the API 332. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 316 for the subscriber making the invocation and executing the metadata as an application in a virtual machine.

Each application server 300 may be communicably coupled to database systems, e.g., having access to the system data 225 and the tenant data 223, via a different network connection. For example, one application server $300_1$ might be coupled via the network 214 (e.g., the Internet), another application server $300_{N-1}$ might be coupled via a direct network link, and another application server $300_N$ might be coupled by yet a different network connection. Transfer Control Protocol and Internet Protocol (TCP/IP) are typical protocols for communicating between application servers 300 and the database system. However, it will be apparent to one skilled in the art that other transport protocols may be used to optimize the system depending on the network interconnect used.

In certain embodiments, each application server 300 is configured to handle requests for any user associated with any organization that is a tenant. Because it is desirable to be able to add and remove application servers from the server pool at any time for any reason, there is preferably no server affinity for a user and/or organization to a specific application server 300. In one embodiment, therefore, an interface system implementing a load balancing function (e.g., an F5 Big-IP load balancer) is communicably coupled between the application servers 300 and the user systems 212 to distribute requests to the application servers 300. In one embodiment, the load balancer uses a least connections algorithm to route user requests to the application servers 300. Other examples of load balancing algorithms, such as round robin and observed response time, also can be used. For example, in certain embodiments, three consecutive requests from the same user could hit three different application servers 300, and three requests from different users could hit the same application server 300. In this manner, the system 216 is multi-tenant, wherein the system 216 handles storage of, and access to, different objects, data and applications across disparate users and organizations.

As an example of storage, one tenant might be a company that employs a sales force where each salesperson uses the system 216 to manage their sales process. Thus, a user might maintain contact data, leads data, customer follow-up data, performance data, goals and progress data, etc., all applicable to that user's personal sales process (e.g., in the tenant data storage 222). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 216 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 216 might also maintain system level data usable by multiple tenants or other data. Such system level data might include industry reports, news, postings, and the like that are sharable among tenants.

In certain embodiments, the user systems 212 (which may be client systems) communicate with the application servers 300 to request and update system-level and tenant-level data from the system 216 that may require sending one or more queries to the tenant data storage 222 and/or the system data storage 224. The system 216 (e.g., an application server 300 in the system 216) automatically generates one or more SQL statements (e.g., one or more SQL queries) that are designed to access the desired information. The system data storage 224 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for a self-monitoring time series database system based on rate of change, the apparatus comprising:
   one or more processors; and
   a non-transitory computer readable medium storing a plurality of instructions, which when executed, cause the one or more processors to:
   receive, by a time series database system, an alert trigger condition associated with a plurality of time series data points corresponding to a plurality of subsystems of the time series database system;
   aggregate, by the time series database system, the plurality of time series data points associated with a first time into a global counter, in response to the time series database system internally collecting the plurality of time series data points associated with the first time from the plurality of subsystems which determine data independently of communicating externally to the plurality of subsystems of the time series database system;
   copy, by the time series database system, the aggregated value in the global counter to a first internal time series data point, the first internal time series data point corresponding to multiple services performed by the time series database system;
   evaluate, by the time series database system, whether the first internal time series data point meets the alert trigger condition;
   aggregate, by the time series database system, the plurality of time series data points associated with a second time into the global counter when the first internal time series data point does not meet the alert trigger condition;
   copy, by the time series database system, the aggregated value in the global counter to a second internal time series data point;
   evaluate, by the time series database system, whether the second internal time series data point meets the alert trigger condition;
   calculate, by the time series database system, a projected internal time series data point based on the first internal time series data point and the second internal time series data point when the second internal time series data point does not meet the alert trigger condition;
   evaluate, by the time series database system, whether the projected internal time series data point meets the alert trigger condition; and
   output, by the time series database system, a projected alert notification associated with the projected internal time series data point and the alert trigger condition when the projected internal time series data point meets the alert trigger condition.

2. The system of claim 1, wherein receiving the alert trigger condition comprises receiving the alert trigger condition from at least one of a system administrator and a configuration file.

3. The system of claim 1, wherein aggregating the plurality of time series data points associated with the first time into the global counter comprises:
   disabling subsystem aggregation tothe global counter;
   resetting the global counter; and
   enabling subsystem aggregation tothe global counter; and.

4. The system of claim 1, wherein calculating the projected internal time series data point based on the first internaltime series data point and the second internal time series data point is further based on at least one of the first internal time series data point and the second internal time series data point meeting a data threshold.

5. The system of claim 1, wherein evaluating whether the projected internaltime series data point meets the alert trigger condition is based on meeting a time threshold.

6. The system of claim 1, wherein outputting the projected alert notification associated with the projected internaltime series data point and the alert trigger condition comprises determining whether an alert notifier is in a cooldown period for the projected alert notification, and outputting the projected alert notification associated with the first internal time series data point and the alert trigger condition when the alert notifier is not in a cooldown period for the projected alert notification.

7. The system of claim 1, comprising further instructions, which when executed, cause the one or more processors to:
aggregate, by the time series database system, the first internal time series data point corresponding to the time series database system with another first time series data point corresponding to another time series database system into a first distributed network time series data point;
evaluate, by the time series database system, whether the first distributed network time series data point meets a corresponding alert trigger condition;
aggregate, by the time series database system, the second internal time series data point corresponding to the time series database system with another second time series data point corresponding to the other time series database system into a second distributed network time series data point when the first distributed network time series data point does not meet the corresponding alert trigger condition;
evaluate, by the time series database system, whether the second distributed network time series data point meets the corresponding alert trigger condition;
calculate, by the time series data base system, a projected distributed network time series data point based on the first distributed network time series data point and the second distributed network time series data point when the second distributed network time series data point does not meet the corresponding alert trigger condition;
evaluate, by the time series data base system, whether the projected distributed network time series data point meets the corresponding alert trigger condition; and
output, by the time series database system, a projected network alert notification associated with the projected distributed network time series data point and the corresponding alert trigger condition when the projected distributed network time series data point meets the corresponding alert trigger condition.

8. A computer program product comprising computer-readable program code to be executed by one or more processors when retrieved from a non-transitory computer-readable medium, the program code including instructions to:
receive, by a time series database system, an alert trigger condition associated with a plurality of time series data points corresponding to a plurality of subsystems of the time series data base system;
aggregate, by the time series database system, the plurality of time series data points associated with a first time into a global counter, in response to the time series database system internally collecting the plurality of time series data points associated with the first time from the plurality of subsystems which determine data independently of communicating externally to the plurality of subsystems of the time series database system;
copy, by the time series database system, the aggregated value in the global counter to a first internal time series data point, the first internal time series data point corresponding to multiple services performed by the time series database system;
evaluate, by the time series database system, whether the first internal time series data point meets the alert trigger condition;
aggregate, by the time series database system, the plurality of time series data points associated with a second time into the global counter when the first internal time series data point does not meet the alert trigger condition;
copy, by the time series database system, the aggregated value in the global counter to a second internal time series data point;
evaluate, by the time series database system, whether the second internal time series data point meets the alert trigger condition;
calculate, by the time series database system, a projected internal time series data point based on the first internal time series data point and the second internal time series data point when the second internal time series data point does not meet the alert trigger condition;
evaluate, by the time series database system, whether the projected internal time series data point meets the alert trigger condition; and
output, by the time series database system, a projected alert notification associated with the projected internal time series data point and the alert trigger condition when the projected internal time series data point meets the alert trigger condition.

9. The computer program product of claim 8, wherein receiving the alert trigger condition comprises receiving the alert trigger condition from at least one of a system administrator and a configuration file.

10. The computer program product of claim 8, wherein aggregating the plurality of time series data points associated with the first time into the global counter comprises:
disabling subsystem aggregation to the global counter;
resetting the global counter; and
enabling subsystem aggregation to the global counter.

11. The computer program product of claim 8, wherein calculating the projected internal time series data point based on the first internal time series data point and the second internal time series data point is further based on at least one of the first internal time series data point and the second internal time series data point meeting a data threshold.

12. The computer program product of claim 8, wherein evaluating whether the projected internal time series data point meets the alert trigger condition is based on meeting a time threshold.

13. The computer program product of claim 8, wherein outputting the projected alert notification associated with the projected internal time series data point and the alert trigger condition comprises determining whether an alert notifier is in a cooldown period for the projected alert notification, and outputting the projected alert notification associated with the first internal time series data point and the alert trigger condition when the alert notifier is not in a cooldown period for the projected alert notification.

14. The computer program product of claim 8, wherein the program code comprises further instructions to:
aggregate, by the time series database system, the first internal time series data point corresponding to the time series database system with another first time series data point corresponding to another time series database system into a first distributed network time series data point;
evaluate, by the time series database system, whether the first distributed network time series data point meets a corresponding alert trigger condition;
aggregate, by the time series database system, the second internal time series data point corresponding to the time series database system with another second time series data point corresponding to the other time series database system into a second distributed network time series data point when the first distributed network time series data point does not meet the corresponding alert trigger condition;

evaluate, by the time series database system, whether the second distributed network time series data point meets the corresponding alert trigger condition;

calculate, by the time series database system, a projected distributed network time series data point based on the first distributed network time series data point and the second distributed network time series data point when the second distributed network time series data point does not meet the corresponding alert trigger condition;

evaluate, by the time series database system, whether the projected distributed network time series data point meets the corresponding alert trigger condition; and output, by the time series database system, a projected network alert notification associated with the projected distributed network time series data point and the corresponding alert trigger condition when the projected distributed networktime series data point meets the corresponding alert trigger condition.

15. A method for a self-monitoring time series database system based on monitored rate of change, the method comprising:

receiving by a time series database system, an alert trigger condition associated with a plurality of time series data points corresponding to a plurality of subsystems of the time series database system;

aggregating, by the time series database system, the plurality of time series data points associated with a first time into a global counter, in response to the time series database system internally collecting the plurality of time series data points associated with the first time from the plurality of subsystems which determine data independently of communicating externally to the plurality of subsystems of the time series database system;

copying, by the time series database system, the aggregated value in the global counter to a first internal time series data point, the first internal time series data point corresponding to multiple services performed by the time series database system;

evaluating, by the time series database system, whether the first internaltime series data point meets the alert trigger condition;

aggregating, by the time series database system, the plurality of time series data points associated with a second time into the global counter when the first internal time series data point does not meet the alert trigger condition;

copying, by the time series database system, the aggregated value in the global counter to a second internal time series data point;

evaluating, by the time series database system, whether the second internal time series data point meets the alert trigger condition;

calculating, by the time series database system, a projected internal time series data point based on the first internal time series data point and the second internal time series data point when the second internaltime series data point does not meet the alert trigger condition;

evaluating, by the time series database system, whether the projected internal time series data point meets the alert trigger condition; and outputting, by the time series database system, a projected alert notification associated with the projected internal time series data point and the alert trigger condition when the projected internal time series data point meets the alert trigger condition.

16. The method of claim 15, wherein receiving the alert trigger condition comprises receiving the alert trigger condition from at least one of a system administrator and a configuration file.

17. The method of claim 15, wherein aggregating the plurality of time series data points associated with the first time into the global counter comprises:
    disabling subsystem aggregation to the global counter;
    resetting the global counter; and
    enabling subsystem aggregation to the global counter.

18. The method of claim 15, wherein calculating the projected internaltime series data point based on the first internaltime series data point and the second internal time series data point is further based on at least one of the first internal time series data point and the second internal time series data point meeting a data threshold, and wherein evaluating whether the projected internal time series data point meets the alert trigger condition is based on meeting a time threshold.

19. The method of claim 15, wherein outputting the projected alert notification associated with the projected internaltime series data point and the alert trigger condition comprises determining whether an alert notifier is in a cooldown period for the projected alert notification, and outputting the projected alert notification associated with the first internal time series data point and the alert trigger condition when the alert notifier is not in a cooldown period for the projected alert notification.

20. The method of claim 15, wherein the method further comprises:

aggregating, by the time series database system, the first internal time series data point corresponding to the time series database system with another first time series data point corresponding to another time series database system into a first distributed network time series data point;

evaluating, by the time series database system, whether the first distributed network time series data point meets a corresponding alert trigger condition;

aggregating, by the time series database system, the second internal time series data point corresponding to the time series database system with another second time series data point corresponding to the other time series database system into a second distributed network time series data point when the first distributed network time series data point does not meet the corresponding alert trigger condition;

evaluating, by the time series database system, whether the second distributed network time series data point meets the corresponding alert trigger condition;

calculating, by the time series database system, a projected distributed network time series data point based on the first distributed network time series data point and the second distributed network time series data point in response to an evaluation that the second distributed network time series data point does not meet the corresponding alert trigger condition;

evaluating, by the time series database system, whether the projected distributed network time series data point meets the corresponding alert trigger condition; and outputting, by the time series database system, a projected network alert notification associated with the projected distributed network time series data point and the corresponding alert trigger condition when the projected distributed network time series data point meets the corresponding alert trigger condition.

* * * * *